(12) United States Patent
Burd

(10) Patent No.: US 9,546,472 B2
(45) Date of Patent: Jan. 17, 2017

(54) AIRCRAFT GALLEY PLUMBING SYSTEM POTABLE WATER MANIFOLD/FILTER BLOCK

(71) Applicant: B/E Aerospace, Inc., Wellington, FL (US)

(72) Inventor: Peter John Leslie Burd, Carmarthenshire (GB)

(73) Assignee: B/E Aerospace, Inc., Wellington, FL (US)

( * ) Notice: Subject to any disclaimer, the term of this patent is extended or adjusted under 35 U.S.C. 154(b) by 651 days.

(21) Appl. No.: 14/019,252

(22) Filed: Sep. 5, 2013

(65) Prior Publication Data

US 2014/0061112 A1 Mar. 6, 2014

Related U.S. Application Data

(60) Provisional application No. 61/697,693, filed on Sep. 6, 2012.

(51) Int. Cl.
| | |
|---|---|
| *E03B 11/00* | (2006.01) |
| *B64D 11/04* | (2006.01) |
| *C02F 1/00* | (2006.01) |
| *B64D 11/02* | (2006.01) |
| *C02F 9/00* | (2006.01) |

(52) U.S. Cl.
CPC ............... *E03B 11/00* (2013.01); *B64D 11/02* (2013.01); *B64D 11/04* (2013.01); *C02F 1/006* (2013.01); *C02F 9/005* (2013.01); *C02F 1/001* (2013.01); *C02F 2201/001* (2013.01); *C02F 2201/005* (2013.01); *C02F 2201/006* (2013.01); *C02F 2209/40* (2013.01); *C02F 2307/10* (2013.01)

(58) Field of Classification Search
CPC ........... E03B 11/00; C02F 9/005; C02F 1/006; C02F 2209/40; C02F 1/001; C02F 2201/001; C02F 2201/005; C02F 2201/006; C02F 2307/10; B64D 11/02; B64D 11/04; B01D 33/804; B01D 29/50; B01D 29/52; B01D 33/35; B01D 33/37; B01D 2201/16; B01D 2201/165; B01D 35/1573
USPC ....... 210/234, 418, 340, 420, 424, 456, 117, 210/136; 137/614.02–614.06, 884
See application file for complete search history.

(56) References Cited

U.S. PATENT DOCUMENTS

| | | | |
|---|---|---|---|
| 5,296,137 A | 3/1994 | Gershon et al. | |
| 5,769,124 A | 6/1998 | Ehrhardt et al. | |
| 2011/0089092 A1* | 4/2011 | Williams | ............ B01D 35/147 210/120 |

FOREIGN PATENT DOCUMENTS

| | | |
|---|---|---|
| DE | 8811041 U1 | 3/1989 |
| EP | 917900 A1 | 5/1999 |

OTHER PUBLICATIONS

EPO, ISR and Written Opinion from International Application PCT/US2013/058534 dated Nov. 26, 2013.

* cited by examiner

*Primary Examiner* — Madeline Gonzalez
(74) *Attorney, Agent, or Firm* — Shumaker, Loop & Kendrick, LLP

(57) ABSTRACT

An aircraft potable water supply system allows unused water to be recovered for later use. The system prevents cross contamination of potable water, waste water and foul water, drains down the entire system upon aircraft shutdown and refills the system in preparation for a resumption of service.

19 Claims, 16 Drawing Sheets

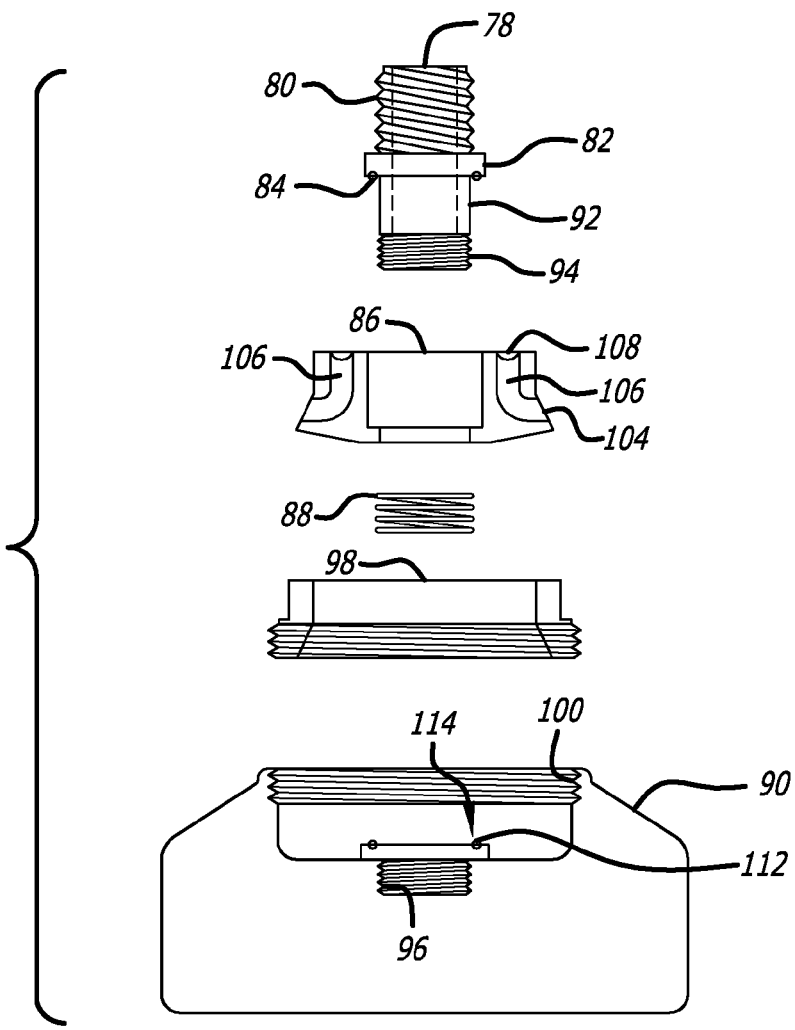
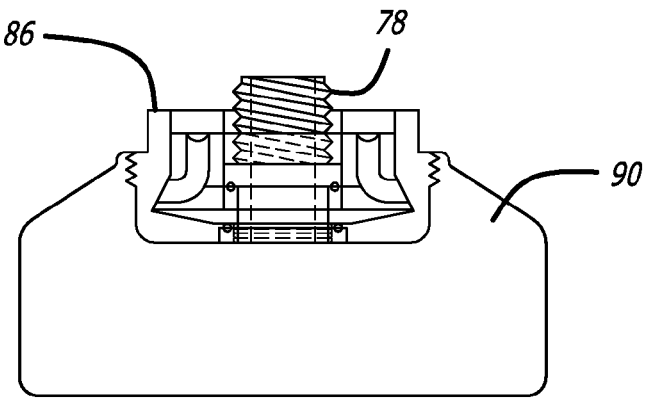

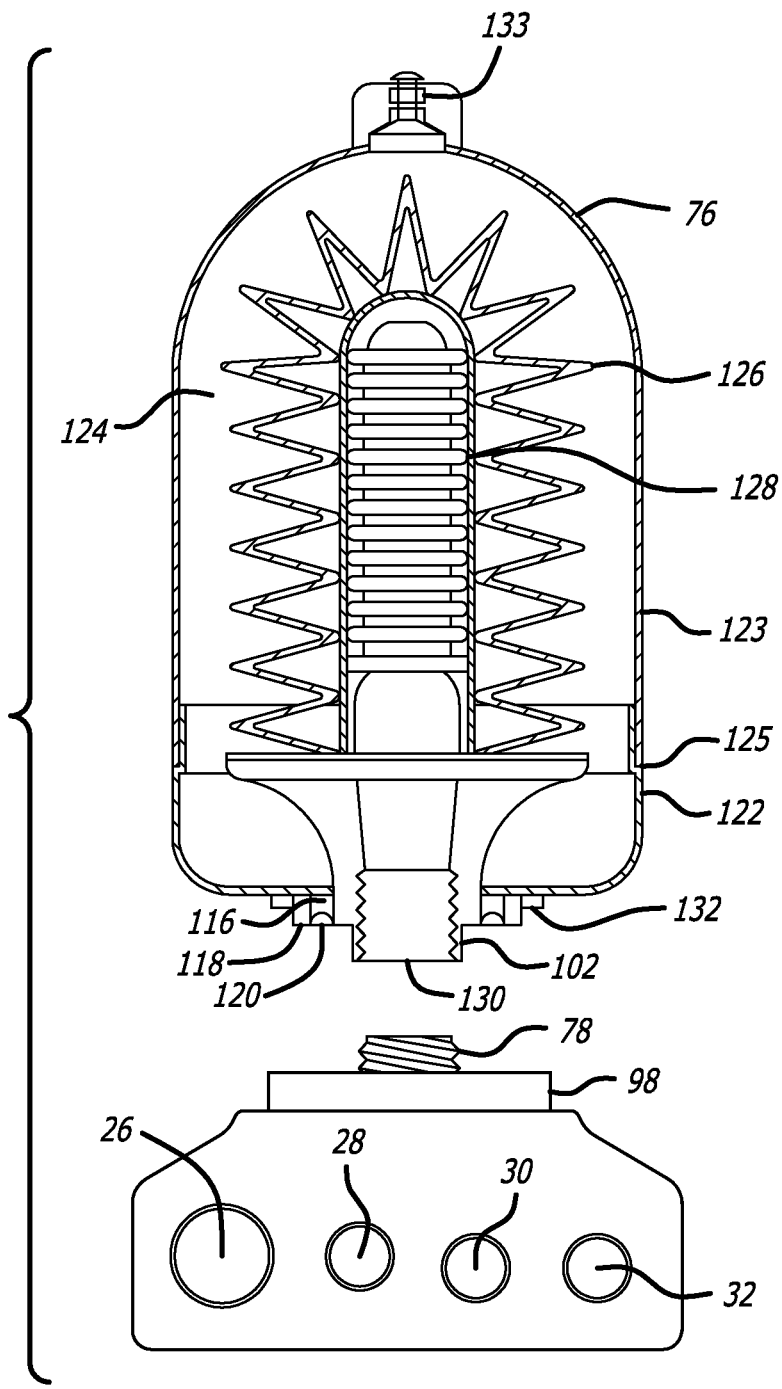

AIRCRAFT GALLEY PLUMBING SYSTEM POTABLE WATER MANIFOLD/FILTER BLOCK

CROSS-REFERENCES TO RELATED APPLICATIONS

This application is based upon and claims priority from U.S. Provisional Application No. 61/697,693, filed Sep. 6, 2012, incorporated by reference in its entirety.

BACKGROUND

The invention generally relates to potable water systems for aircraft, and more particularly pertains to a system configuration which allows unused water to be recovered for later use.

On commercial aircraft with in-flight catering services, it is common for one or more of the galleys installed on the aircraft to be "wet" i.e. to have a water supply (potable water), waste water drainage, and on occasion water used in a waste disposal unit (foul water—post use).

The potable water is supplied under pressure to the galley, while gravity, which can be assisted by a vacuum, is used in water drainage and waste disposal. Potable water is used as drinking water, beverage making and cooking, such as in steam ovens, rice boilers and the like, and has to be fit for human consumption, to this end it has to meet certain minimum health and safety standards and is generally filtered to improve taste, smell and to remove bacteria, according to specific airline policy. The plumbing system therefore encompasses all aspects of water usage on a galley, its associated hardware, components and galley equipment which either consume or facilitate water handling.

All galley plumbing systems must pass design and regulatory requirements specified by the aircraft manufacturers and have to undergo proving tests to ensure that the potable, waste and foul water systems are fully functional and remain separated ensuring cross contamination cannot occur.

Also, when the aircraft shuts down on completion of a flight, or for longer periods of storage or maintenance, all of the systems must be capable of draining completely within a specified time, no residual water, that could potentially become contaminated, is allowed to be retained within the plumbing system, to this end it must be capable of letting air to be displaced during filling, and air to enter the system during drainage allowing rapid water displacement.

It has previously been common practice for potable water that has passed through a water filter to be regarded as waste water, however recent changes in policy by aircraft manufacturers driven by the need to conserve water means that in some instances potable water only becomes waste water when potable water has entered a galley sink, has been exposed to air, or has become foul water such as passing through a galley waste disposal unit, for example, and all other water fed devices, including water boilers, faucets, ovens, filters and the like, can now be allowed drain back into the fresh water tanks.

A galley plumbing system is needed that is capable of effectively and efficiently recovering potable water from water fed devices upon aircraft shutdown and refilling such water fed devices in preparation for a resumption of service.

SUMMARY OF THE INVENTION

The present invention provides a galley plumbing system that precludes cross contamination of potable water, waste water and foul water, that recovers potable water from various water fed devices upon aircraft shutdown and that automatically recharges such water fed devices in preparation for a resumption of service. All sections of the potable water supply that may potentially trap air are capable of self-venting and self-sealing immediately after potable water has displaced air in order to the render the filling operation to be automatic without need of manual assistance at the resumption of service. The pressure when filling the potable water circuit is variable depending upon the aircraft and design. Hot water backflow to the faucet from galley inerts or appliances is prevented for safety concerns. Hydraulic pressure reduction serves to improve flow and increase water consumption capacity.

The present invention provides distribution control and filtration for the aircraft supplied potable water, typically within a reduced "wet" galley envelope of 34 to 35 inches, for example. The invention takes the form of a manifold that distributes the potable water supply to water consuming galley inerts or appliances and a galley water faucet, and, additionally provides a pressurized supply for a pressure check valve, such as for use with a top fed or elevated potable water supply, for example. The manifold incorporates a direct acting shut off valve that isolates the potable water supply if required.

In the case of a bottom fed potable water system, the potable water system supply is shut off remotely, since the shut off valve is typically located at a floor level aircraft interface port. The pressurized supply to the pressure check valve is also provided by the same device. Both manifolds incorporate a remote manual override for a compact air stop valve.

The manifold accepts two low pressure high flow water filter cartridges, separately feeding the galley inerts or appliances and faucet, wherein such cartridges could be of the disposable canister type, be maintenance shop serviceable or be RTB (return to base) exchange renewable. Additionally the filters provide automatic drain down for the manifold/filter block when the potable water system is depressurized at the end of flight service.

These and other features and advantages of the present invention will become apparent from the following detailed description of preferred embodiments which, taken in conjunction with the accompanying drawings, illustrate by way of example the principles of the invention.

BRIEF DESCRIPTION OF THE DRAWINGS

FIG. 9B is an exploded cross-sectional view of a valve block assembly of the filter block and potable water distribution manifold taken along line 9B-9B of FIG. 9A.

FIG. 9C is a schematic view of the assembled valve block assembly of FIG. 9B showing the flow control valve in an open configuration.

FIG. 9H is a schematic exploded view of a water filter and a back view of the assembled valve block assembly of the filter block and potable water distribution manifold of the galley plumbing system of FIG. 1.

DETAILED DESCRIPTION OF THE PREFERRED EMBODIMENTS

The present invention provides for an aircraft galley plumbing system that is capable of recovering potable water from throughout the system upon shut down and recharging the system for a resumption of service. The system is adaptable to both top fed as well as bottom fed potable water supplies.

Figure 1:
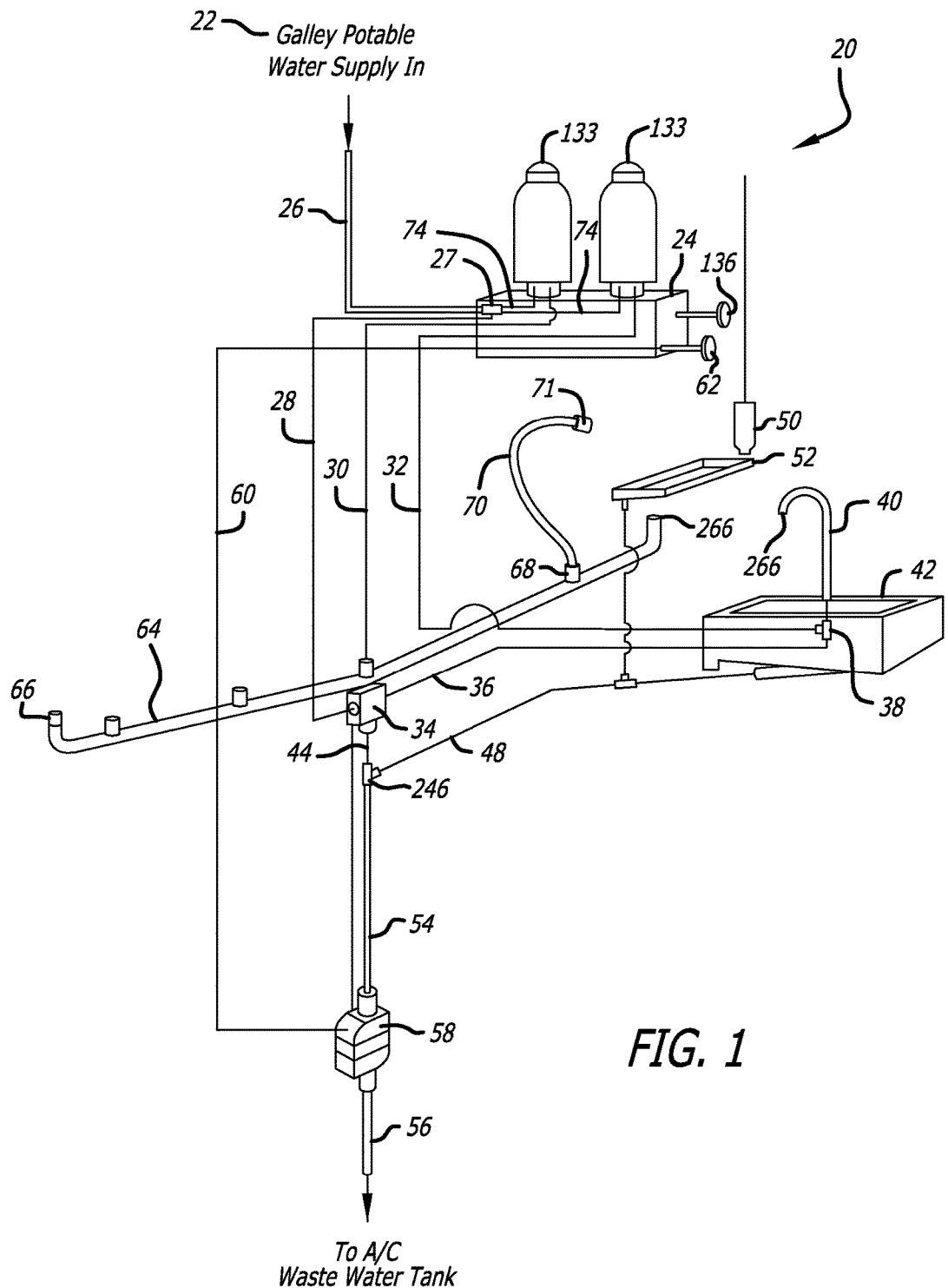
FIG. 1 is a schematic illustration of a first preferred embodiment of a galley plumbing system of the present invention with a top fed potable water supply.

Referring to FIGS. 1, 3-5, 9A-9I, 10A-10D and 11A-11I, in a first preferred embodiment the present invention provides for an aircraft galley plumbing system 20 having a top fed potable water supply 22. The general plumbing schematic diagram of FIG. 1 shows the relationship of the potable water filter and distribution mounting block or manifold 24, depicted within the encircled region of FIG. 1, to other components and water lines of the aircraft galley plumbing system, further described hereinbelow.

Referring to FIGS. 1 and 3-5, the potable water filter and distribution mounting block or manifold of the aircraft galley plumbing system with a top fed potable water supply includes a potable water inlet port 26, through which water from the aircraft supply enters the potable water filter and distribution mounting block or manifold at a potable water inlet port through a three way valve 27, which distributes the water between a pressure check valve pressure line outlet port 28, an individual galley inerts or appliances outlet port 30, and an individual faucet outlet port 32. The three way valve also distributes the potable water supply from the potable water inlet port to self-sealing flow control valves connected to cartridge filters, as will be further explained below.

The pressure check valve pressure line outlet port is connected in fluid communication with a pressure check or pressure lock valve 34 which controls flow from a faucet drain line 36 from a T-connector 38 connected in turn with the individual faucet outlet port and a self-venting faucet 40 of a surface mounted sink 42. The pressure check or pressure lock valve is also connected with a potable water supply system drain down line 44 which also receives waste water through a T-connector 46 from a sink waste water drain line 48 from the surface mounted sink, as well as waste water from a condensate drainage catch pot 50 and a GAIN drip tray 52 connected to the main waste water drain line. Flow of the sink waste water drain line and the potable water supply system drain down line through the potable and waste water drain line 54 to a galley waste water supply outlet 56 is controlled by a compact air stop valve 58 which is in turn controlled by activation of a backflow prevention valve manual override cable 60 that can be actuated by an air stop valve manual override control handle, knob or pull 62 provided in the potable water filter and distribution mounting block or manifold.

The individual galley inerts or appliances outlet port is connected in fluid communication with a self-venting galley inerts or appliances water distribution manifold 64 having one or more self-venting devices 66 and having individual galley inserts or appliances outlet connectors 68, typically including a galley inert or appliance flex hose 70 with a quick disconnect connector, for example.

Figure 9A:
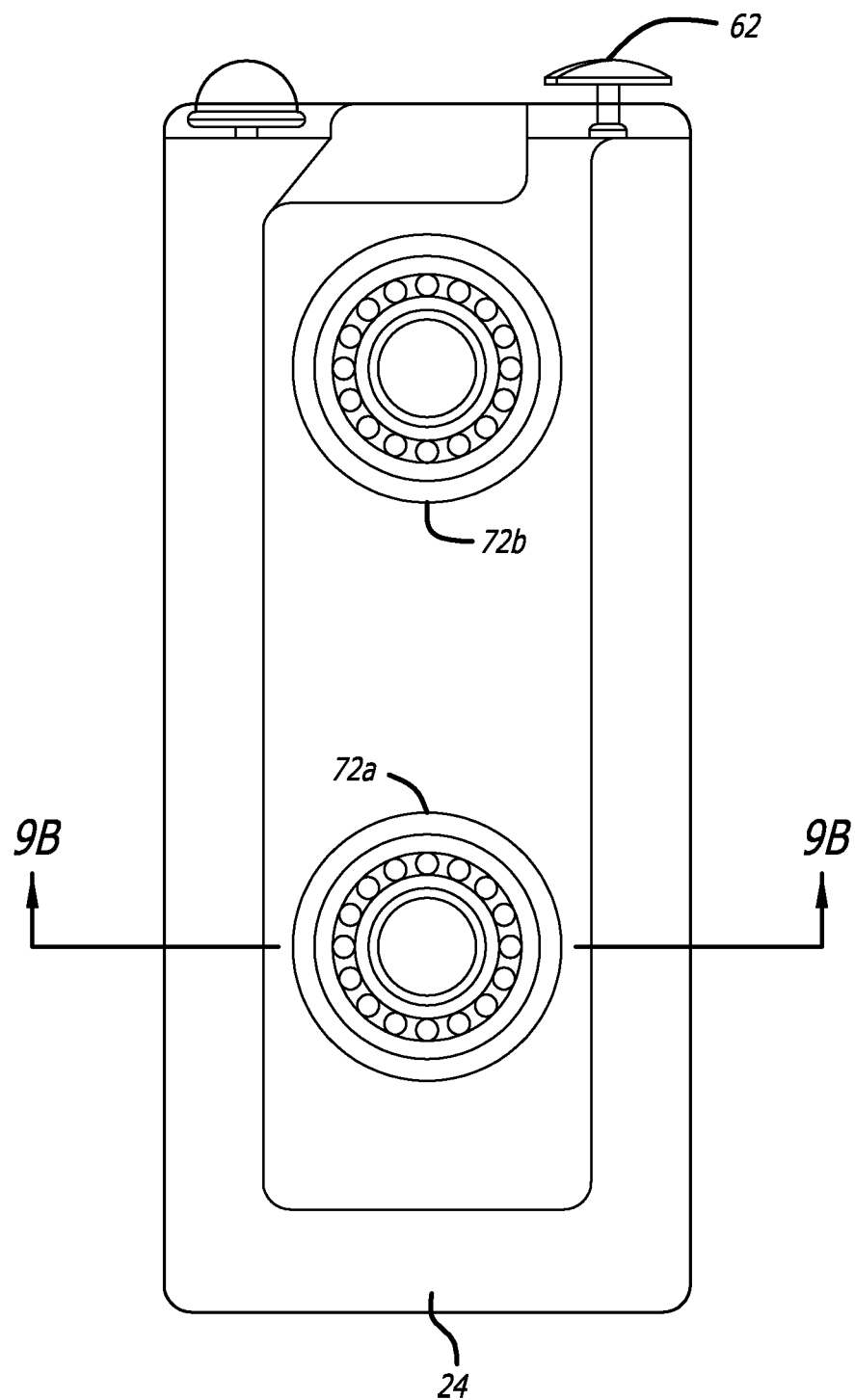
FIG. 9A is a top view of the filter block and potable water distribution manifold of the galley plumbing system similar to FIG. 3.
Figure 9D:
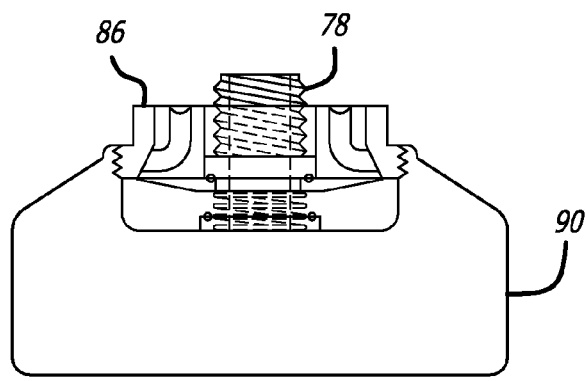
FIG. 9D is a schematic view of the assembled valve block assembly of FIG. 9B showing the flow control valve in a closed configuration.
Figure 9E:
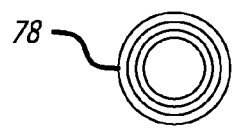
FIG. 9E is a top view of the water filter attachment stud of the assembled valve block assembly of FIG. 9B.
Figure 9F:
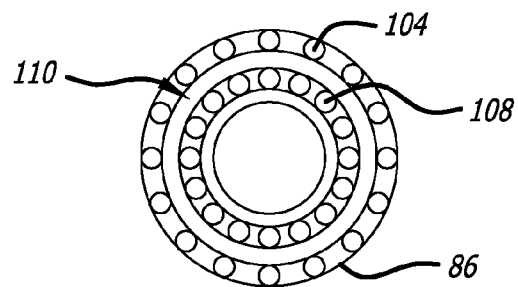
FIG. 9F is a top view of the water flow control valve of the assembled valve block assembly of FIG. 9B.
Figure 9G:
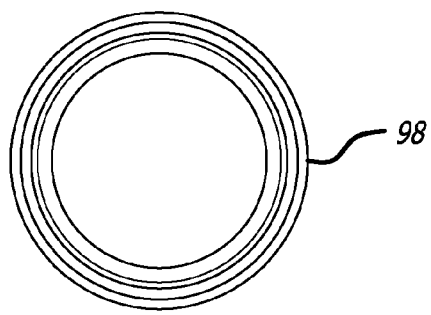
FIG. 9G is a top view of the water flow control valve locking ring of the assembled valve block assembly of FIG. 9B.
Figure 10A:
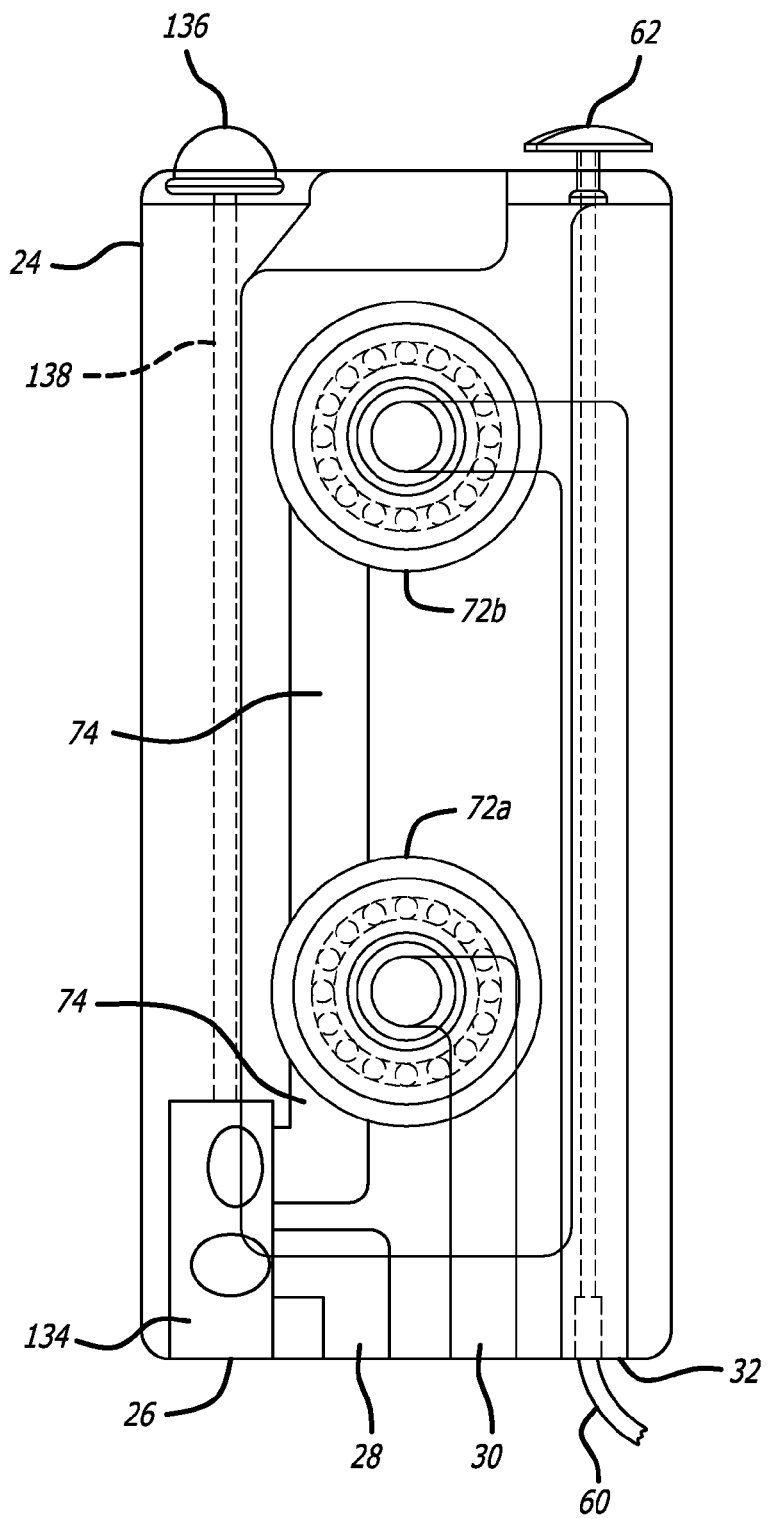
FIG. 10A is a schematic top view similar to FIG. 9A showing internal passages of the filter block and potable water distribution manifold of the galley plumbing system of FIG. 1.
Figure 10B:
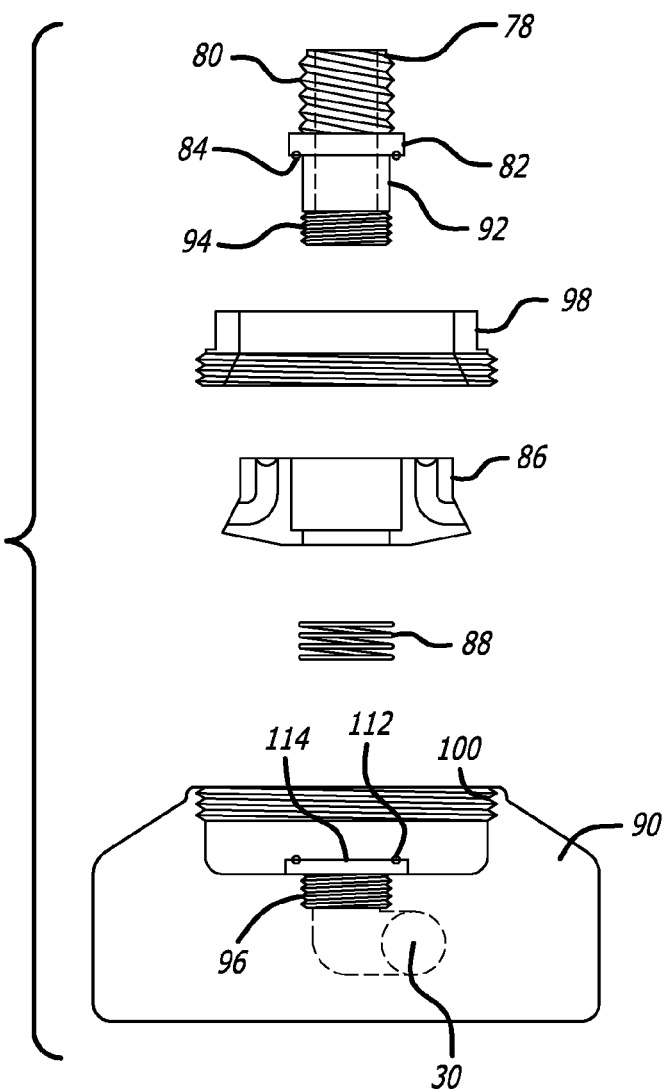
FIG. 10B is an exploded cross-sectional view of a valve block assembly of the filter block and potable water distribution manifold taken along line 10B-10B of FIG. 10A and showing internal passages.
Figure 10C:
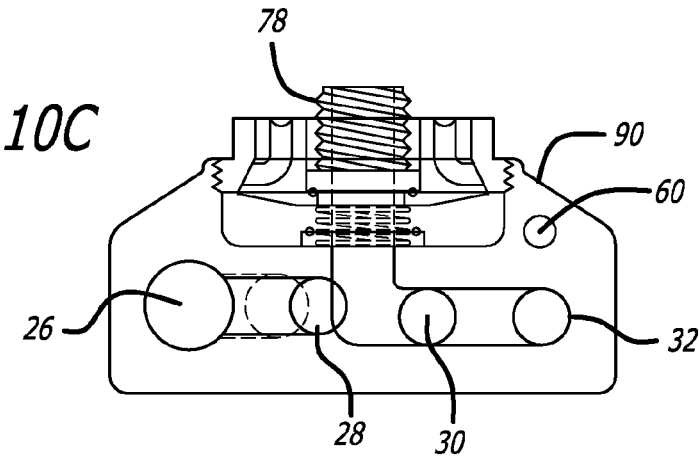
FIG. 10C is a schematic view of the assembled valve block assembly of FIG. 10B showing the flow control valve in a closed configuration and showing internal passages.
Figure 10D:
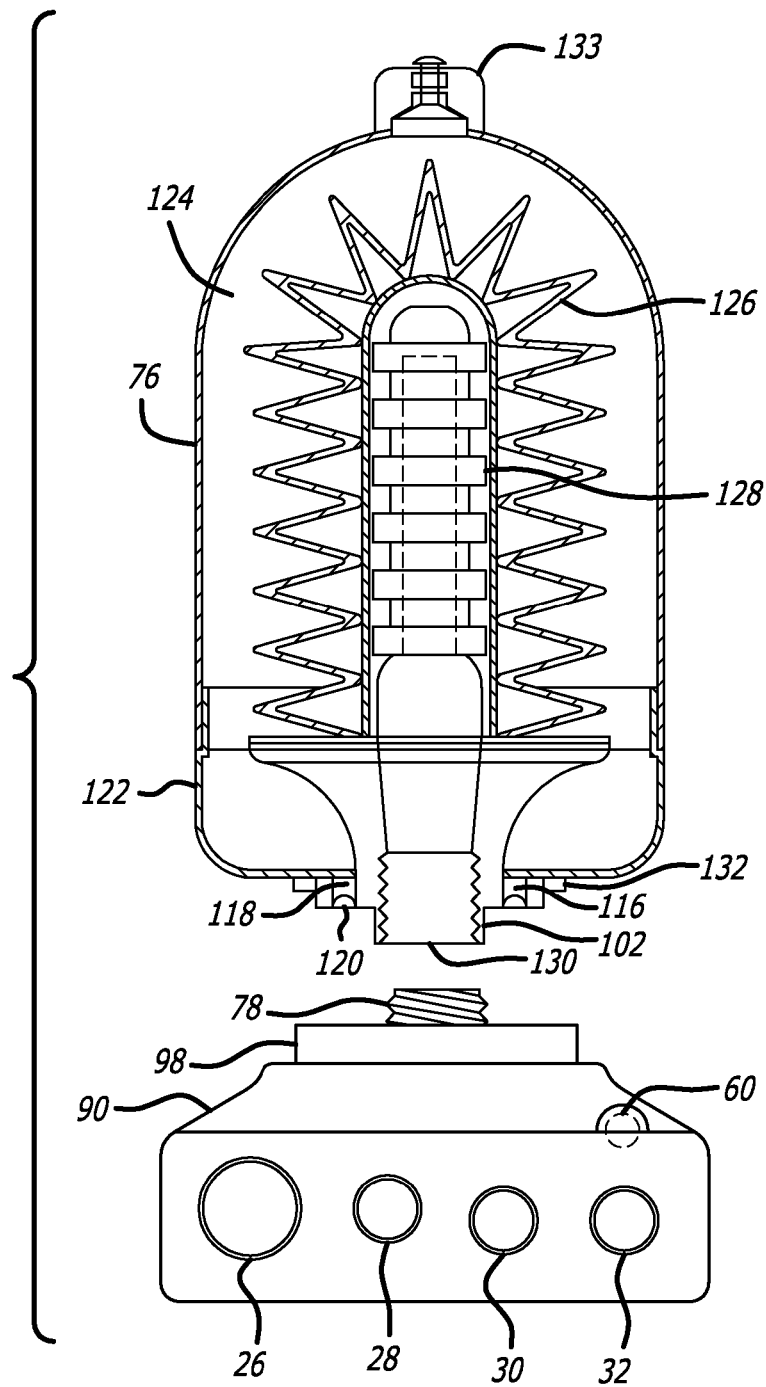
FIG. 10D is a schematic exploded view similar to FIG. 9H and showing internal passages.

Referring to FIGS. 3, 5, 9A-J, 10A-H and 11A-I, the top fed water filter mounting block or manifold houses two self-sealing flow control valves 72, typically including a first self-sealing flow control valve 72a configured to distribute potable water to the individual galley inerts or appliances outlet port and a second self-sealing flow control valve 72b configured to distribute potable water to the individual faucet outlet port, for example, that are connected in fluid communication through water filter supply lines 74 with the potable water inlet port to receive the potable water supply, to supply each of two individual water filter cartridges 76 that are configured to be removably connected to the self-sealing flow control valves of the top fed potable water filter/distribution mounting block/manifold, respectively. The self-sealing flow control valves include water filter attachment studs or nipples 78 that are connected in fluid communication with other internal valve components, and that provide attachments for each of two individual water filter cartridges, respectively, via the male threads 80. As is illustrated in FIGS. 9B and 10B, the water filter attachment studs include a central flange 82 that incorporates an O-ring seal 84 on the underside of the central flange, which allows the annular water flow control valve or puck valve 86 to be sealed by a closure spring 88 disposed between the water flow control valve and the filter block body 90, when a water filter cartridge is removed, as is shown in FIG. 9D, showing a cutaway of the valve block assembly when the control valve is in a closed configuration.

The water filter attachment studs include a lower tubular shaft portion 92 connected to the central flange, and the lower tubular shaft portion includes male threads 94 that are received in a female threaded portion 96 of the filter block body. The whole assembly illustrated in FIG. 9B is held in place in the filter block body by a water flow control valve locking ring 98, received in internal, female threads 100 of the filter block body.

Referring to FIGS. 9B, 9C, 9D, 9F and 9H, the action of screwing a water filter cartridge into place using female threaded connection 102 to a stud pushes the control valve down against the closure spring, such that the water flow control valve moves to an open configuration when a water filter cartridge is installed, which in turn exposes water inlet holes 104 of flow channels 106 that are normally seated against and closed by the locking ring, so that water can then flow through the water inlet holes to the outlets 108 of the flow channels in the annular water flow control valve's annular ring 110. When fully depressed, the water control valve seals against a rubber O-ring 112 fitted to a protruding collar 114 within the filter block body. When fully installed, corresponding flow channels 116 in the annular ring 118 of a base 120 of a water filter cartridge allow water to pass into the water filter cartridge housing 122, typically having an upper portion 123 threadably connected to a lower portion 125, into the interior main chamber 124 of the water filter cartridge through the filter 126 of the water filter cartridge, into the interior main outlet channel 128, out the central water outlet 130 of the water filter, and back into the water filter mounting block or manifold to the filtered water supply outlet ports. The water filter cartridge seals against the filter block body by means of a filter body seal 132. In another presently preferred aspect, the water filter cartridge includes a self-venting sealing device 133, typically at a top portion of the water filter cartridge.

Figure 11A:
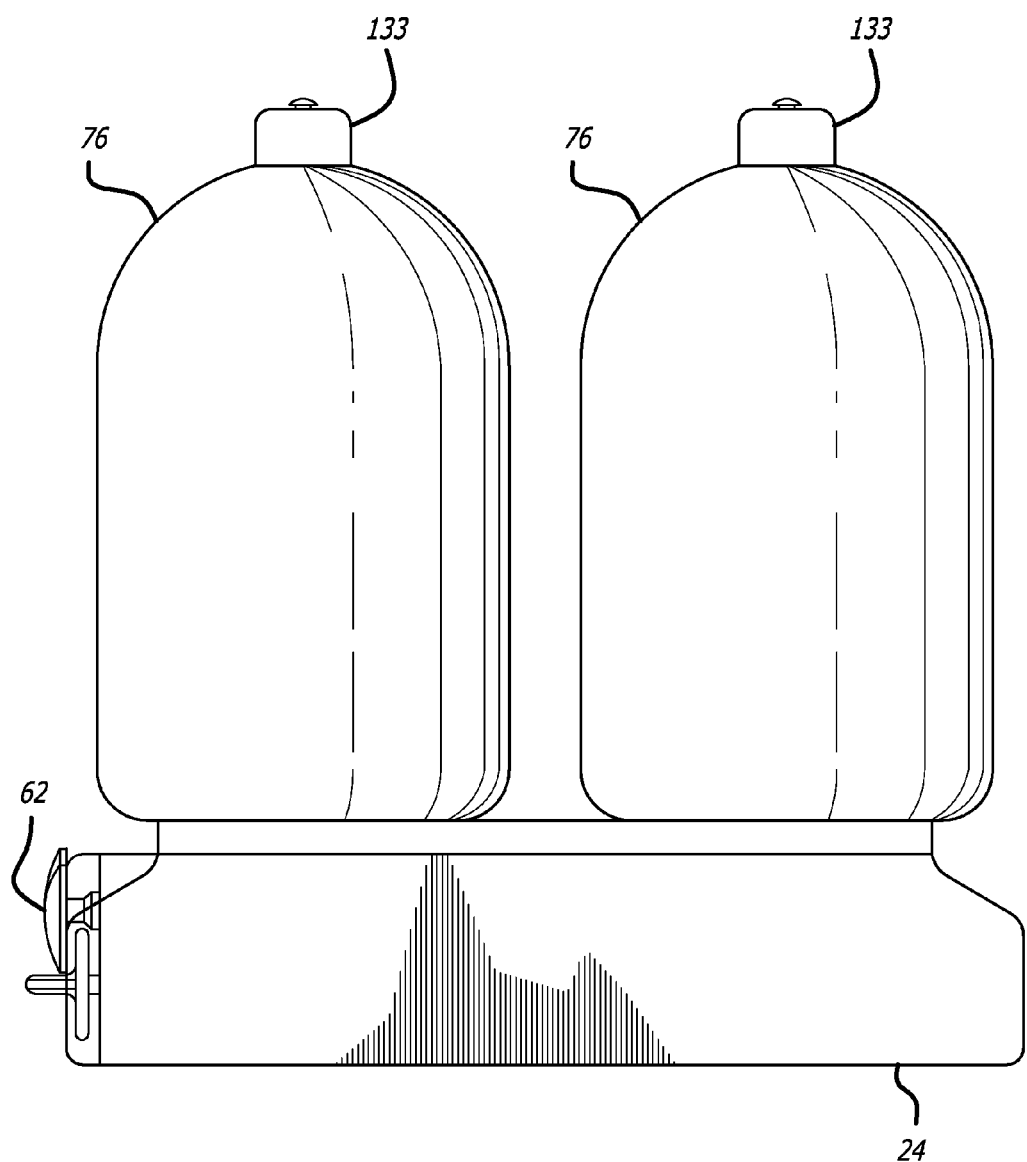
FIG. 11A is a side elevational view of the filter block and potable water distribution manifold of the galley plumbing system of FIG. 1.
Figure 11B:
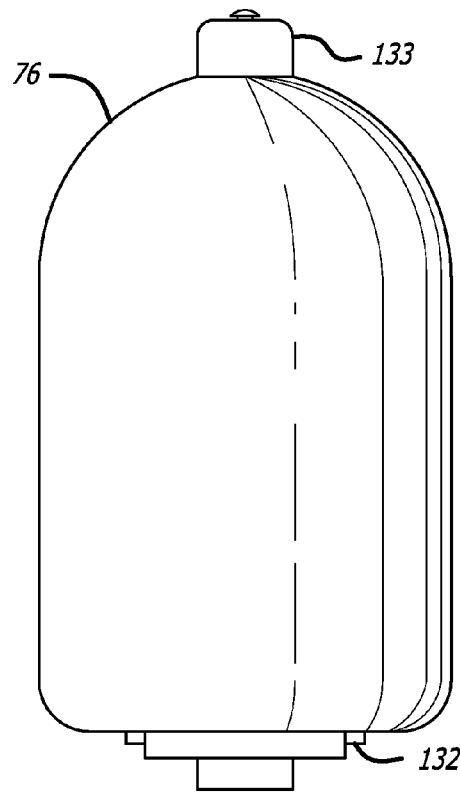
FIG. 11B is as side elevational view similar to FIG. 9H of a water filter of FIG. 1.
Figure 11C:
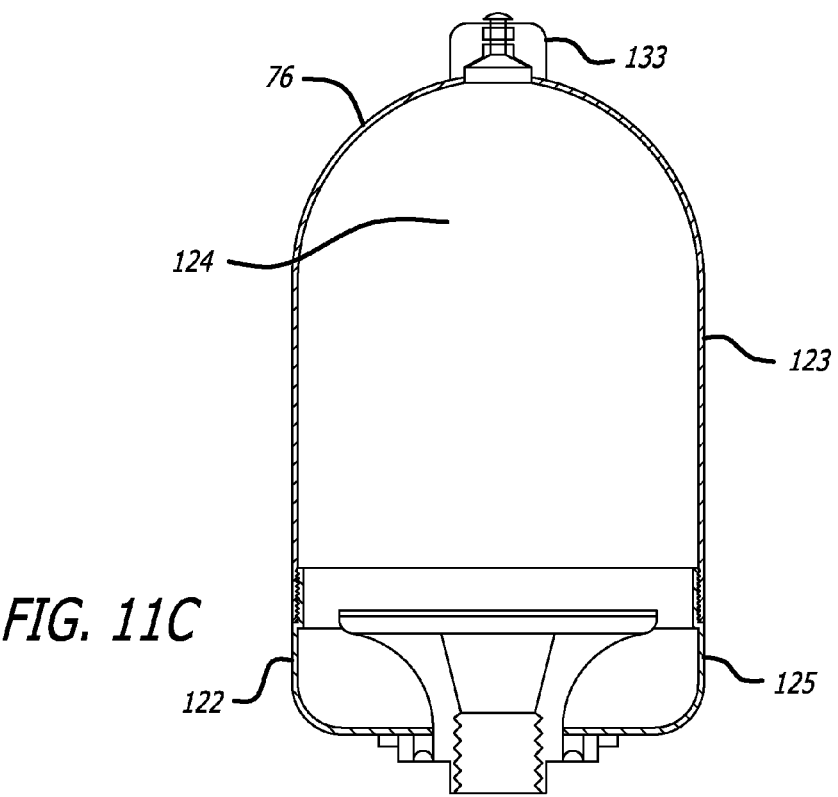
FIG. 11C is a schematic diagram of the housing assembly of the water filter of FIG. 11B.
Figure 11D:
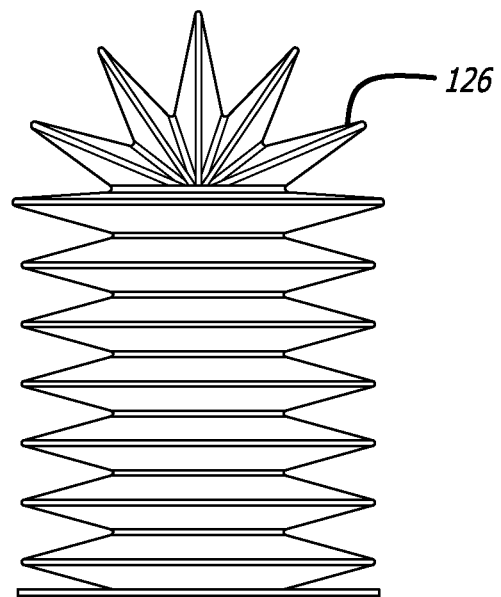
FIG. 11D is a side elevational view of the high flow carbon impregnated particle filter of FIG. 9H.
Figure 11E:
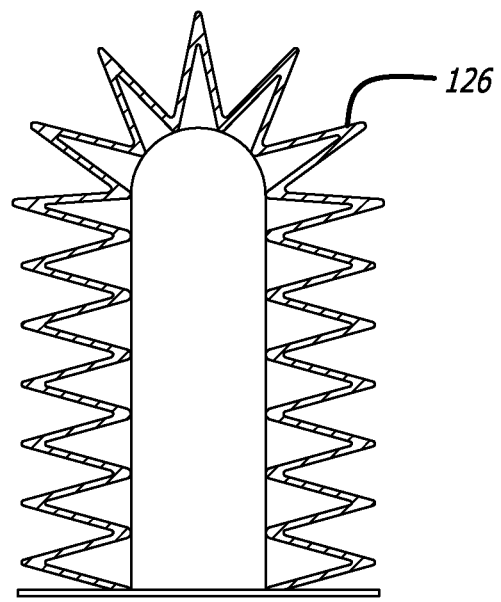
FIG. 11E is a schematic diagram of the high flow carbon impregnated particle filter of FIG. 11D.
Figure 11F:
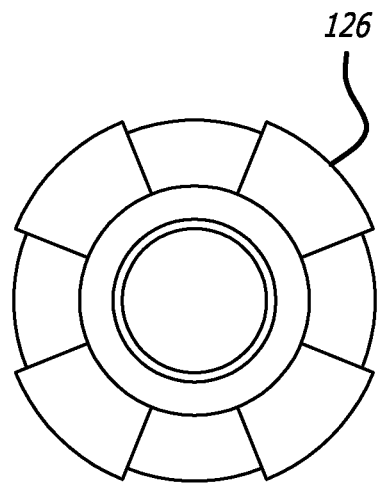
FIG. 11F is a bottom view of the high flow carbon impregnated particle filter of FIG. 11D.
Figure 11G:
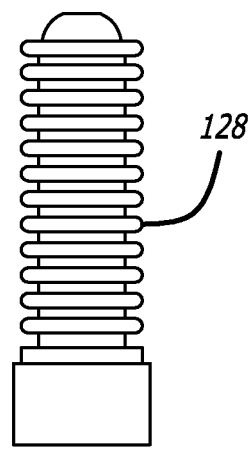
FIG. 11G is a side elevational view of the high flow sintered carbon cartridge of FIG. 9H.
Figure 11H:
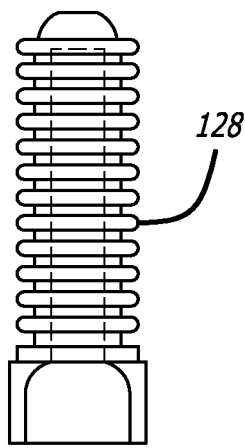
FIG. 11H is a schematic diagram of the high flow sintered carbon cartridge of FIG. 11G.
Figure 11I:
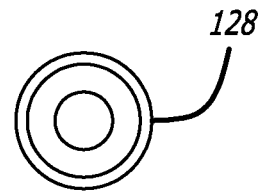
FIG. 11I is a bottom view of the high flow sintered carbon cartridge of FIG. 11G.

FIG. 11A shows a side profile of the manifold block complete with mounted filter cartridges, the filter cartridge housing with the filter removed, external and internal views of the particle filter and bacteriological cartridge and detail of the particle filter base. The specific design and function of the filter cartridge may vary and include additional bacteriological inserts that may be combined with the basic cartridge to produce different filtration capabilities. The tabs of the filter base engage with slots in the filter cartridge mounting pedestal, the filter is rotated to secure it in place.

Each potable water filter and distribution mounting block or manifold preferably includes a direct acting potable water shut off valve 134 actuated by a water shut off control knob or handle 136, typically located at the front of the block, and operatively connected to the water shut off valve by a water shut off valve control cable or rod 138 that typically extends through the body of the potable water filter and distribution mounting block or manifold to the potable water shut off valve from the water shut off control knob or handle.

When the potable water shut off valve is activated, the pressure check valve pressure line outlet port feed line to the pressure check valve is typically pressurized slightly in advance of the filter supply lines to the self-sealing flow control valves, which allows the pressure check valve to start to close whilst the filters are self venting and the plumbing system is filling with water. When an aircraft has completed a flight, and the aircraft systems are turned off, the drop in potable water pressure allows the valve to open, letting the previously isolated water supply lines drain through the valve and avoiding the risk of contamination from water that may remain trapped in the system, air is allowed to enter the system via the filter and manifold venting devices facilitation rapid and complete drain down.

Figure 2:
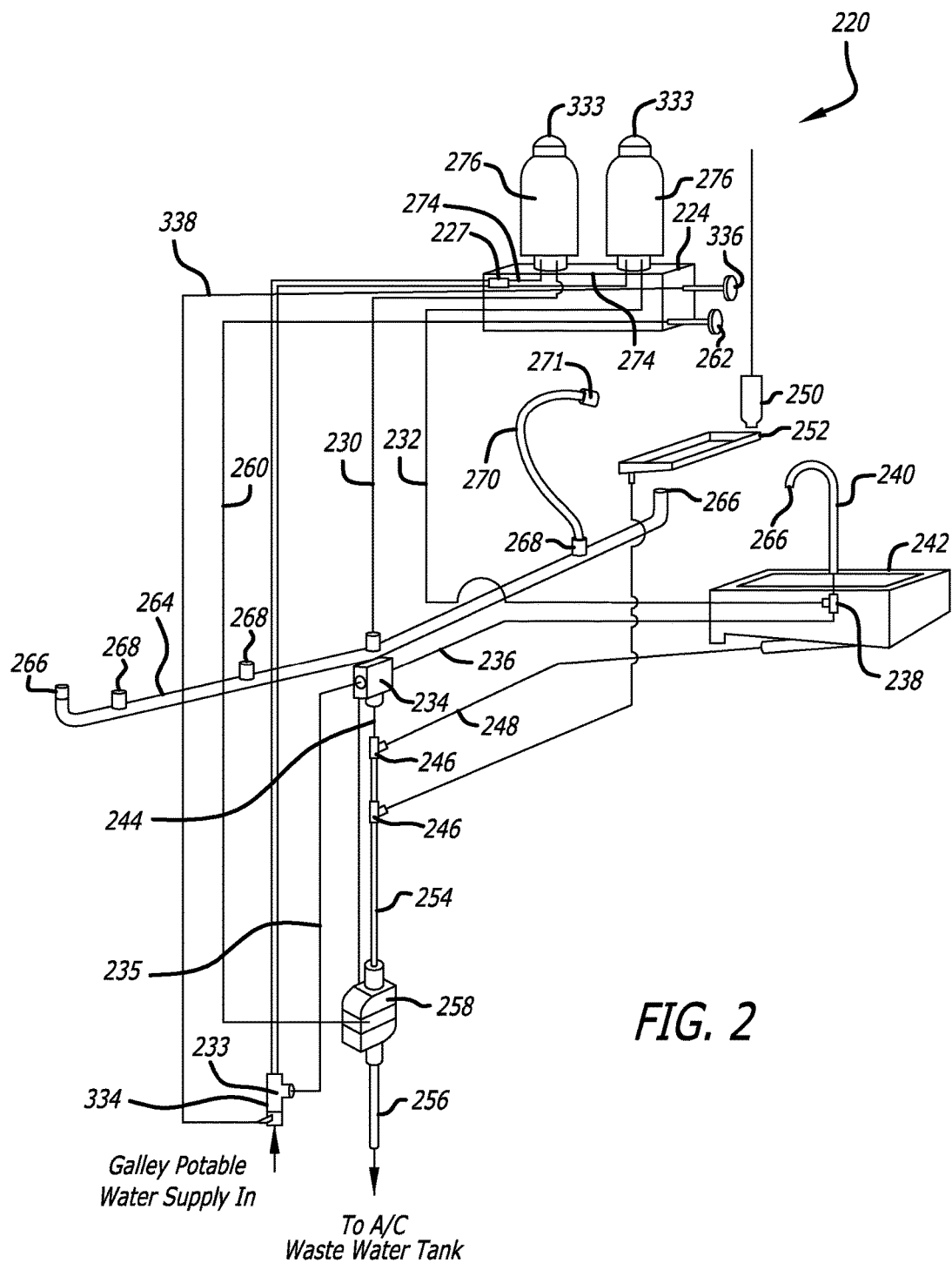
FIG. 2 is a schematic illustration of a second preferred embodiment of a galley plumbing system of the present invention with a bottom fed potable water supply.
Figure 3:
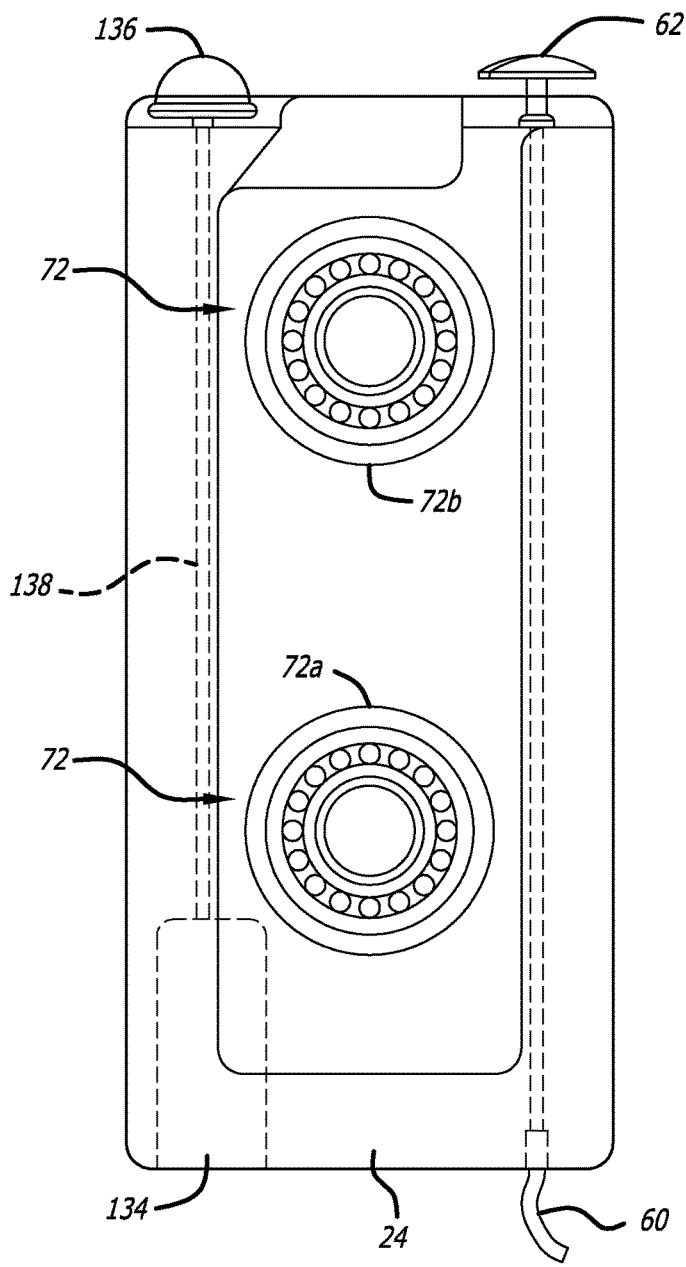
FIG. 3 is a top view of the filter block and potable water distribution manifold of the galley plumbing system of FIG. 1.
Figure 4:
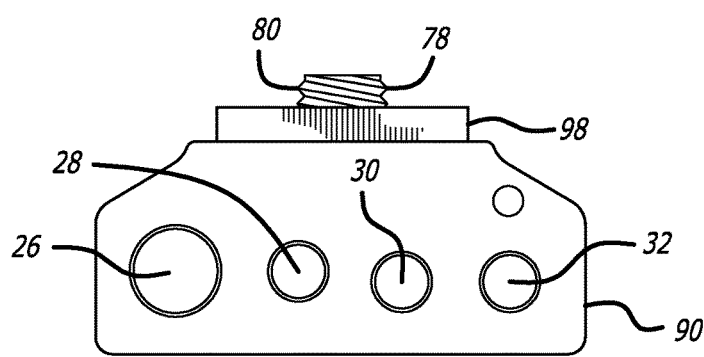
FIG. 4 is a back view of the filter block and potable water distribution manifold of the galley plumbing system of FIG. 1.
Figure 5:
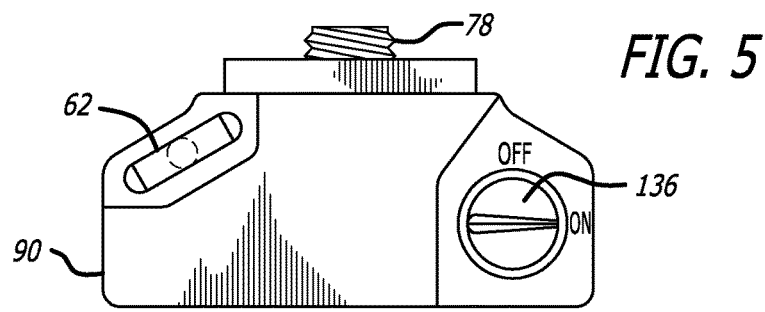
FIG. 5 is a front view of the filter block and potable water distribution manifold of the galley plumbing system of FIG. 1.

Referring to FIGS. 2 and 6-8, the present invention also provides for a second preferred embodiment of an aircraft galley plumbing system 220 having a bottom fed potable water supply 222, adapted for use on aircraft that have a potable water system feed at floor level. The general plumbing schematic diagram of FIG. 2 shows the relationship of the potable water filter and distribution mounting block or manifold 224, depicted within the encircled region of FIG. 2, to other components and water lines of the aircraft galley plumbing system, further described hereinbelow.

Water from the aircraft supply enters the manifold or filter block at potable water inlet port 226, through a two way valve 227, which distributes the water to the individual galley inerts or appliances outlet port 230 and individual faucet outlet port 232. The two way valve also distributes the potable water supply from the potable water inlet port to a first and second self-sealing flow control valves connected to cartridge filters and configured to distribute potable water to an individual galley inerts or appliances outlet port and an individual faucet outlet port, respectively. The bottom fed potable water supply is connected in fluid communication through a T-connector 233 via a pressure check valve direct feed line 235 to a pressure check or pressure lock valve 234, which controls flow from a faucet drain line 236 from a T-connector 238, connected in turn with the individual faucet outlet port and a self-venting faucet 240 of a surface mounted sink 242.

The pressure check or pressure lock valve is also connected with a potable water supply system drain down line 244, which also receives waste water through a T-connector 246 from a sink waste water drain line 248 from the surface mounted sink, as well waste water from a condensate drainage catch pot 250 and a galley inert or appliance drip tray 252 connected to the waste water drain line. Flow of the sink waste water drain line and the potable water supply system drain down line through the potable and main waste water drain line 254 to a galley waste water supply outlet 256 controlled by a compact air stop valve 258, which is in turn controlled by activation of a backflow prevention valve manual override cable 260 that can be actuated by an air stop valve manual override control handle, knob or pull 262 provided in the potable water filter and distribution mounting block or manifold.

The individual galley inerts or appliances outlet port is connected in fluid communication with a self-venting galley inerts or appliances water distribution manifold 264 having one or more self-venting devices 266, and having individual galley inerts or appliances outlet connectors 268, typically including a galley inert or appliance flex hose 270 with a quick disconnect connector 271, for example.

Figure 6:
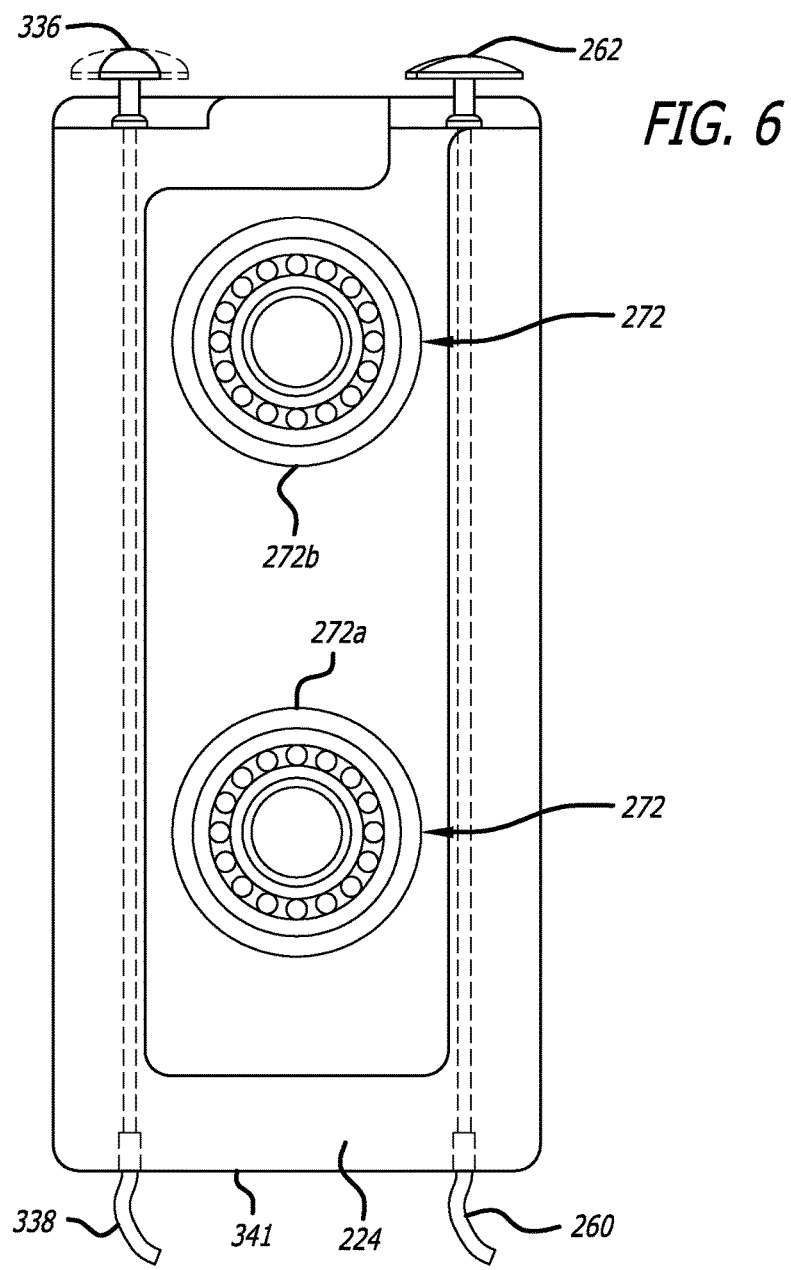
FIG. 6 is a top view of the filter block and potable water distribution manifold of the galley plumbing system of FIG. 2.
Figure 7:
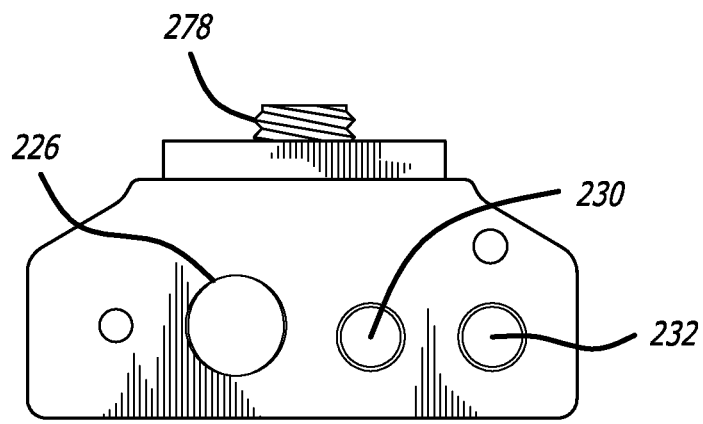
FIG. 7 is a back view of the filter block and potable water distribution manifold of the galley plumbing system of FIG. 2.
Figure 8:
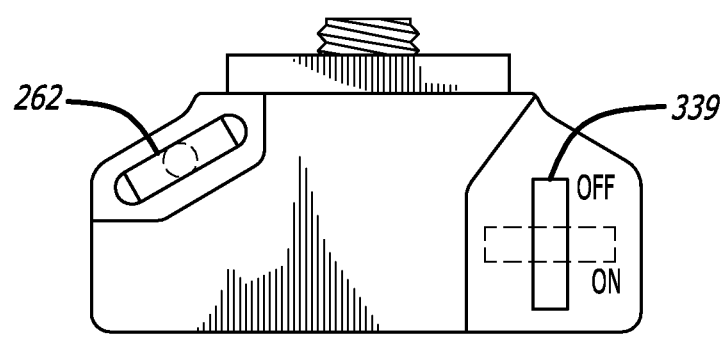
FIG. 8 is a front view of the filter block and potable water distribution manifold of the galley plumbing system of FIG. 2.

Referring to FIGS. 6-8, the bottom fed water filter mounting block or manifold houses two self-sealing flow control valves 272, typically including a first self-sealing flow control valve 272a configured to distribute potable water to the individual galley inserts or appliances outlet port and a second self-sealing flow control valve 272b configured to distribute potable water to the individual faucet outlet port, for example, that are connected in fluid communication through water filter supply lines 274 with the potable water inlet port to receive the potable water supply, to supply each of two individual water filter cartridges 276 that are configured to be removably connected to the self-sealing flow control valves of the bottom fed potable water filter/distribution mounting block/manifold, respectively. Referring to FIGS. 7 and 8, the self-sealing flow control valves include water filter attachment studs or nipples 278 that are connected in fluid communication with other internal valve components, and that provide attachments for each of two individual water filter cartridges, respectively. In another presently preferred aspect, the water filter cartridge includes a self-venting sealing device 333, typically at a top portion of the water filter cartridge.

Each potable water filter and distribution mounting block or manifold preferably includes a direct acting potable water shut off valve 334 actuated by a water shut off control pull handle 336, typically located at the front of the block, and operatively connected to the water shut off valve by a water shut off valve control cable or rod 338 that typically extends through the body of the potable water filter and distribution mounting block or manifold to the potable water shut off valve from the water shut off control knob or handle.

Typically, in the case of a floor located potable water aircraft supply port, the shut off valve has to be located close to the port to avoid lengthy burst protection hosing for the supply line, consequently the water shut off is remotely operated by cable. As is illustrated in FIG. 8, in contrast to the top fed system illustrated in FIGS. 3-5, the rotary water shut off control can be replaced with a pull handle 339 for operating the water shut off valve, the cable emerging at the rear of the block 341, and the potable water connection can be relocated to occupy the position of the pressure check valve connection, which is be relocated to the remote shut off valve, while the filtered water supply connection locations are unchanged. The air stop valve manual override remains the same for both block types.

The aircraft galley plumbing of the present invention provides for the integration of the functional distribution and control of the potable water supply of an aircraft into a single unit. The unique high flow low back pressure self sealing water filter flow control valves allow rapid installation and removal of the filters. The twin filter design allows higher flow volumes and separate feeds for faucet and galley inerts or appliances eliminating hot water back flow issues from the galley inerts or appliances to the faucet without the need for a thermostatic shut off valve. The water cartridge design can be disposable, or have renewable internal filters using the same outer shell while the water filter cartridge filter modular design allows variation in filter capability with the same basis components.

Moreover, the present invention serves to reduce part count and complexity of a typical galley plumbing system by concentrating control functionality and distribution into a single component. The systems improves system water flow volumes and reduces pressure restrictions while catering for differing water filtration requirements for faucet and galley inert or appliance supplies. The water filter cartridges are self venting and self sealing while the self sealing water control valves in the distribution block manifold can be overridden using a by-pass cap in emergencies. The system is readily configurable for both top fed as well as bottom fed aircraft potable water supply systems, and is lightweight as it can be made from non-metallic materials. A pressurized supply to the pressure check valve as part of the integrated compact galley plumbing system is provided and allows for automatic filling and drain down of the entire integrated compact galley plumbing system.

What is claimed is:

1. A potable water filter and distribution mounting manifold for an aircraft galley plumbing system, comprising:
   a potable water inlet port configured to receive water from a potable water supply;
   first and second self-sealing water flow control valves connected in fluid communication with the potable water inlet port to receive the potable water supply, each of said first and second self-sealing water flow control valves having an open configuration and a closed configuration, said first self-sealing water flow control valve being configured to distribute potable water to an individual galley inserts or appliances outlet port, and said second self-sealing water flow control valve being configured to distribute potable water to an individual faucet outlet port;
   a water distribution valve connected in fluid communication with said potable water inlet port, said water distribution valve being configured to distribute potable water to said first and second self-sealing flow control valves; and
   a pair of individual water filter cartridges configured to be removably connected to the first and second self-sealing water flow control valves, respectively, to receive a supply of water from said potable water inlet port, each of said first and second self-sealing water flow control valves being configured to move to the open configuration when a water filter cartridge is installed, and to move to the closed configuration when a water filter cartridge is removed.

2. The potable water filter and distribution mounting manifold of claim 1, wherein each of said first and second self-sealing water flow control valves includes a water filter attachment stud configured to mount said individual water filter cartridges, respectively.

3. The potable water filter and distribution mounting manifold of claim 1, further comprising an air stop valve manual override control handle for controlling a compact air stop valve configured to control flow of a waste water drain line and a potable water supply system drain down line to a galley waste water supply outlet.

4. The potable water filter and distribution mounting manifold of claim 1, wherein said individual galley inerts or appliances outlet port is connected in fluid communication with a self-venting galley inerts or appliances water distribution manifold including at least one self-venting device.

5. The potable water filter and distribution mounting manifold of claim 1, further comprising a water shut off control handle for controlling activation of a potable water shut off valve connected to said potable water inlet port and configured to shut off the potable water supply through said potable water inlet port.

6. The potable water filter and distribution mounting manifold of claim 5, wherein said water shut off control handle is operatively connected to the water shut off valve by a water shut off valve control cable that extends through the potable water filter and distribution mounting manifold.

7. The potable water filter and distribution mounting manifold of claim 1, wherein said water distribution valve is a three way valve, connected in fluid communication with a pressure check valve pressure line outlet port connected in fluid communication with a pressure check or pressure lock valve configured to control flow from a faucet drain line to a potable water supply system drain down line.

8. The potable water filter and distribution mounting manifold of claim 1, wherein said water distribution valve is a two way valve.

9. The potable water filter and distribution mounting manifold of claim 1, wherein said potable water supply comprises a top fed potable water supply.

10. The potable water filter and distribution mounting manifold of claim 1, wherein said potable water supply comprises a bottom fed potable water supply.

11. An aircraft galley plumbing system, comprising:
a potable water inlet port configured to receive water from a potable water supply;
a galley waste water supply outlet configured to receive waste water from a waste water drain line and a potable water supply system drain down line configured to receive waste water from galley inserts and galley appliances;
potable water filter and distribution mounting manifold including first and second self-sealing water flow control valves connected in fluid communication with the potable water inlet port to receive the potable water supply, each of said first and second self-sealing water flow control valves having an open configuration and a closed configuration, said first self-sealing water flow control valve being configured to distribute potable water to an individual galley inserts or appliances outlet port, and said second self-sealing water flow control valve being configured to distribute potable water to an individual faucet outlet port, and a water distribution valve connected in fluid communication with said potable water inlet port, said water distribution valve being configured to distribute potable water to said first and second self-sealing flow control valves;
a pair of individual water filter cartridges configured to be removably connected to the first and second self-sealing water flow control valves, respectively, to receive a supply of water from said potable water inlet port, each of said first and second self-sealing water flow control valves being configured to move to the open configuration when a water filter cartridge is installed, and to move to the closed configuration when a water filter cartridge is removed;
a potable water shut off valve connected to said potable water inlet port and configured to shut off the potable water supply through said potable water inlet port;
a compact air stop valve configured to control flow of the waste water drain line and the potable water supply system drain down line to the galley waste water supply outlet.

12. The aircraft galley plumbing system of claim 11, wherein each of said first and second self-sealing water flow control valves includes a water filter attachment stud configured to mount said individual water filter cartridges, respectively.

13. The aircraft galley plumbing system of claim 11, wherein said individual galley inserts or appliances outlet port is connected in fluid communication with a self-venting galley inserts or appliances water distribution manifold including at least one self-venting device.

14. The aircraft galley plumbing system of claim 11, further comprising a water shut off control handle for controlling activation of said potable water shut off valve.

15. The aircraft galley plumbing system of claim 14, wherein said water shut off control handle is operatively connected to the water shut off valve by a water shut off valve control cable that extends through the potable water filter and distribution mounting manifold.

16. The aircraft galley plumbing system of claim 11, wherein said water distribution valve is a three way valve, connected in fluid communication with a pressure check valve pressure line outlet port connected in fluid communication with a pressure check or pressure lock valve configured to control flow from a faucet drain line to a potable water supply system drain down line.

17. The aircraft galley plumbing system of claim 11, wherein said water distribution valve is a two way valve.

18. The aircraft galley plumbing system of claim 11, wherein said potable water supply comprises a top fed potable water supply.

19. The aircraft galley plumbing system of claim 11, wherein said potable water supply comprises a bottom fed potable water supply.

\* \* \* \* \*